Figure 1:
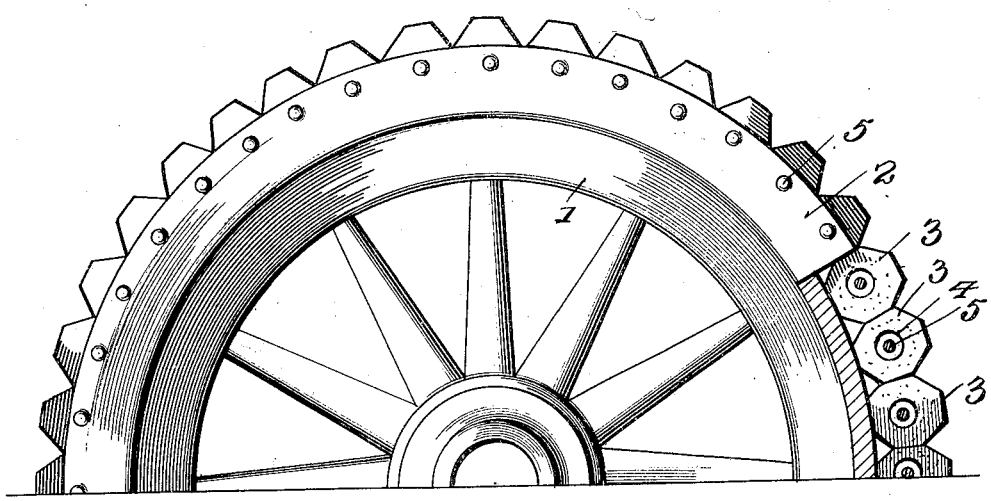

C. F. DINKLE.
TIRE.
APPLICATION FILED APR. 3, 1907.

935,192.  Patented Sept. 28, 1909.

Witnesses  
Inventor  
C. F. Dinkle  
By  Attorneys.

UNITED STATES PATENT OFFICE.

CHARLES F. DINKLE, OF CARLISLE, PENNSYLVANIA.

TIRE.

935,192.

Specification of Letters Patent. Patented Sept. 28, 1909.

Application filed April 2, 1907. Serial No. 366,148.

*To all whom it may concern:*

Be it known that I, CHARLES F. DINKLE, a citizen of the United States, residing at Carlisle, in the county of Cumberland and State of Pennsylvania, have invented certain new and useful Improvements in Tires, of which the following is a specification.

This invention contemplates certain new and useful improvements in resilient tires for the wheels of automobiles, and other vehicles generally, and the invention has for its object an improved resilient tire which will avoid the disadvantageous features that are inherent in the pneumatic and endless cushion tires and will possess to a high degree the characteristics of simplicity, durability, efficiency in operation, ease of assembling and detaching, cheapness in the first cost of manufacture and in the cost of maintenance, in that my improved tire is composed of a plurality of rubber cushion sections each complete in itself, and susceptible of insertion or removal independently of the others; in that any one or more sections may, after becoming worn at one tread portion, be so adjusted that the worn part can be turned in next to the base of the rim and a new wearing face exposed to the road surface; in that the tire cannot be punctured, or rim cut, or fly off the rim; in that any section may be removed and replaced by a new one whenever necessary without doing away with the whole tire; and in that the capability of compression of the sections cannot be exceeded, because the rubber sections are pressed down in the channel rim deep enough to be protected by the sides of the channel and when overloaded will simply flatten out in the direction of the circumference of the rim until the edge of the metal rim comes into contact with the ground, which will occur before the limit of elasticity is reached and insure that the sections will immediately assume their original shape when the pressure is released, it being a well known fact that when rubber is compounded to give the greatest amount of wear, it will stand a certain amount of expansive and crushing strain to the square inch, and that when this amount of strain is largely exceeded the rubber loses its resiliency and becomes useless. This is a common defect in the rubber tires of the endless type, and one which my invention avoids.

With this and other objects in view as will more fully appear as the description proceeds, the invention consists in certain constructions, arrangements and combinations of the parts which I shall hereinafter fully describe and then point out the novel features in the appended claims.

Figure 2:
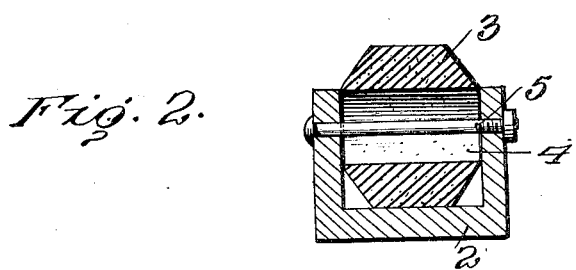

For a full description of the invention and the merits thereof and also to acquire a knowledge of the details of construction, and the means for effecting the result, reference is to be had to the following description and accompanying drawings, in which:

Figure 1 is a side elevation of a portion of a vehicle wheel of the artillery automobile type embodying the improvements of my invention, this type of wheel being selected merely for the purposes of illustration. Fig. 2 is a transverse sectional view through the rim of the wheel and one of the tire sections.

Corresponding and like parts are referred to in the following description and indicated in all the views of the drawings by the same reference characters.

Referring to the drawings, the numeral 1 designates the felly of the wheel and 2 the rim thereof which is secured to the felly by rim bolts, (not shown) or in any desired manner, and which is preferably composed of electrically welded steel forming an endless structure. Preferably the side walls of the rim are at right angles to the base of the same to produce the channel for the reception of the tire sections. The rubber cushioned tire sections 3 which are of a symmetrical formation are each formed with a transversely extending bore 4 extending entirely therethrough and adapted to receive a tie bolt 5 of any desired construction or type, extending entirely through the bore and secured to the opposite sides of the channeled rim 2, as clearly illustrated in the drawings. It is to be particularly noted that the diameter of the bore 4 is considerably larger than the diameter of the bolt 5, which construction imparts to the section more resiliency than if the bolt fit the bore tightly. Each tire section 3 is provided with a plurality of tread faces, as shown, and the sections are placed with their faces or peripheries abutting throughout the entire series of sections, entirely around the circumference of the wheel. The sections may be of any desired number and size, as judgment may dictate, according to the size of the wheel and the requirements of the particular case.

The sections 3 are shown as octagon shaped, one plane face forming the tread surface of the section, the opposite face adapted to engage the bottom of the channel, and the two alternate and opposite faces abutting with some considerable degree of compression against the corresponding faces of the adjacent sections.

From the foregoing description in connection with the accompanying drawings, it is manifest that after one face shall have become worn by pressure or other action on the surface, the worn section may be turned around so as to bring the worn face to an inexposed position such as against the base of the rim, which will result in presenting a fresh or unworn face outermost as a new tread portion, and that this operation may be repeated until all of the faces shall have become worn, when the completely worn out section may be easily removed by withdrawing its bolt 5, and be replaced by a new section, at a comparatively small cost, without disturbing any of the other sections, and without the necessity of casting away the whole tire or the necessity of vulcanizing or otherwise repairing the worn place, which, as well known, is a poor expedient at the best.

It is to be noted that the sides of the channel rim 2 cover more than one half the end faces of the rubber sections and are of a height to normally cover the ends of the bores 4, thereby preventing any transverse flattening out of the sections and protecting the same from becoming rim cut or crushed beyond their limit of elasticity, and that as the sides of the rim are at right angles to the base and are parallel with the plane end faces of the sections which fit the rim snugly, the sections may spring up and down under pressure and release, their resiliency being increased owing to the fact that the bores 4 are of considerably larger diameter than the tie bolts 5. As the sections are placed together as closely as possible, a sufficient number being used to make a continuous rubber tire entirely around the rim of the wheel with corrugated tread, engagement of the sections with each other tends to hold the tread faces in the proper position in service.

It is to be understood that my invention is not limited to any shape or size of section.

Having thus described the invention, what is claimed as new is:

1. In a tire, the combination of a channeled rim, a series of rubber sections fitting within the channeled portion of the rim, and each provided with a plurality of flat tread faces, one of the flat tread faces of each section normally abutting against one of the flat tread faces of an adjacent section so as to hold said sections against rotary movement, said rubber sections being of symmetrical formation, so that when one tread face becomes worn they may be turned to present a fresh tread face, and each of the sections being formed with a smooth unobstructed transverse bore and being solid except for the bore, and tie bolts passing through the bores of the respective rubber sections and spaced from the interior walls of said bores with their opposite ends connected to the flanges of the channeled rim, said flanges of the rim closely engaging the end sections of the rubber sections and being of such a height as normally to close the ends of the bores whereby the rubber sections are securely locked against transverse expansion and are caused to flatten out against the circumference of the rim when pressure is applied thereto.

2. In a tire, the combination of a channeled rim of angular formation, a series of octagonal rubber sections fitting within the channeled portion of the rim and provided with a plurality of flat tread faces, one of the flat tread surfaces of each section normally abutting against one flat tread face of an adjacent section so as to hold said sections against rotary movement, the said rubber sections being of symmetrical formation so that when one tread face of each section becomes worn said sections may be turned to present a fresh tread face, and each of the sections being formed with a smooth, unobstructed transverse bore, and being solid except for the bore, and tie bolts passing through the bores of the respective rubber sections, and connecting said flanges of the channeled rim, said tie bolts having a diameter smaller than the diameters of the bores of the rubber sections so as not to interfere with the expansion and contraction of the rubber sections, and said flanges of the rim closely engaging the ends of the rubber sections and being of such a height as normally to close the ends of the bores, whereby the rubber sections are securely locked against transverse expansion and are caused to flatten out in the direction of the circumference of the rim when pressure is applied thereto.

In testimony whereof I affix my signature in presence of two witnesses.

CHARLES F. DINKLE. [L. S.]

Witnesses:
 W. H. DINKLE,
 C. M. LIGGETT.